(12) United States Patent
Ueno et al.

(10) Patent No.: US 9,004,269 B2
(45) Date of Patent: Apr. 14, 2015

(54) CONVEYOR CHAIN

(75) Inventors: Masatsugu Ueno, Osaka (JP); Makoto Fujiwara, Osaka (JP)

(73) Assignee: Tsubakimoto Chain Company, Osaka (JP)

( * ) Notice: Subject to any disclaimer, the term of this patent is extended or adjusted under 35 U.S.C. 154(b) by 0 days.

(21) Appl. No.: 13/323,953

(22) Filed: Dec. 13, 2011

(65) Prior Publication Data
US 2012/0181148 A1 Jul. 19, 2012

(30) Foreign Application Priority Data

Jan. 13, 2011 (JP) ................................ 2011-005107

(51) Int. Cl.
B65G 45/08 (2006.01)
F16G 13/06 (2006.01)
B65G 17/38 (2006.01)

(52) U.S. Cl.
CPC ................ *F16G 13/06* (2013.01); *B65G 17/38* (2013.01); *B65G 45/08* (2013.01)

(58) Field of Classification Search
CPC ................................ F16G 13/06; B65G 45/08
USPC .......... 198/500, 779, 838, 845; 474/231, 206, 474/209, 181, 182; 384/564, 548, 492, 463, 384/490, 484
See application file for complete search history.

(56) References Cited

U.S. PATENT DOCUMENTS

| 4,101,180 | A | * | 7/1978 | Anderson et al. ............. 384/418 |
| 4,795,408 | A | * | 1/1989 | Kotegawa et al. ............ 474/209 |
| 4,915,511 | A | * | 4/1990 | Kotegawa et al. ............ 384/127 |
| 6,070,711 | A | * | 6/2000 | Murano et al. ................ 198/779 |
| 6,524,013 | B2 | * | 2/2003 | Beghini et al. ................ 384/602 |
| 6,742,935 | B2 | * | 6/2004 | Saji ............................... 384/587 |
| 6,855,080 | B2 | * | 2/2005 | Kanehira et al. ............. 474/231 |

(Continued)

FOREIGN PATENT DOCUMENTS

| JP | 54-18554 | 2/1979 |
| JP | 59-54220 | 4/1984 |

(Continued)

OTHER PUBLICATIONS

Japanese Office Action issued in JP 2011-005107 on Nov. 12, 2013 (with translation).

(Continued)

*Primary Examiner* — Gene Crawford
*Assistant Examiner* — Thomas Randazzo
(74) *Attorney, Agent, or Firm* — Stephen H. Eland; Dann, Dorfman, Herrell & Skillman

(57) ABSTRACT

A conveyor chain constructed so as to prevent a leakage of lubricant oil to the outside. The conveyor chain comprises a plurality of bearing elements operable to revolve in a raceway between an outer circumferential surface of a bush and an inner circumferential surface of a roller. A pair of right and left thrust bearing annular members are press-fitted onto the outer circumferential surface of the bush and are positioned between the inner side surface of an inner link plate and the outwardly-facing end surfaces of the bearing elements. Annular sealing members for sealing lubricant oil within bearing element raceway are disposed between the inner circumferential surface of the roller and an inner circumferential surface of the thrust bearing annular member. The sealing members slidably contact but are not deformed by the inner circumferential surface of the roller.

18 Claims, 13 Drawing Sheets

(56) References Cited

U.S. PATENT DOCUMENTS

| | | | |
|---|---|---|---|
| 7,972,233 B2* | 7/2011 | Fujiwara et al. | 474/209 |
| 8,011,497 B2* | 9/2011 | Ono | 198/851 |
| 2002/0070504 A1* | 6/2002 | Neubert et al. | 277/353 |
| 2002/0110297 A1 | 8/2002 | Saji | |
| 2002/0173392 A1* | 11/2002 | Doi et al. | 474/209 |
| 2003/0032511 A1 | 2/2003 | Kanehira et al. | |
| 2003/0167749 A1* | 9/2003 | Garbagnati et al. | 59/4 |
| 2008/0124015 A1* | 5/2008 | Fujiwara et al. | 384/484 |

FOREIGN PATENT DOCUMENTS

| | | | | |
|---|---|---|---|---|
| JP | 59-74909 | 5/1984 | | |
| JP | 61-45625 | 3/1986 | | |
| JP | 63-26612 | 2/1988 | | |
| JP | 10-196565 | 7/1998 | | |
| JP | 2002227938 | * 1/2001 | ............ | B65G 17/38 |
| JP | 2002-235812 | 8/2002 | | |
| JP | 2002340106 | 11/2002 | | |
| JP | 2003-056650 | 2/2003 | | |
| JP | 2003227938 | 8/2003 | | |
| JP | 2009216201 | 9/2009 | | |

OTHER PUBLICATIONS

Japanese Office Action issued in JP 2011-005107 on Apr. 30, 2014.
English Summary of portions of Japanese Office Action issued in JP 2011-005107 on Apr. 30, 2014.

* cited by examiner

PRIOR ART

CONVEYOR CHAIN

CROSS REFERENCE TO RELATED APPLICATIONS

This application claims the foreign priority benefit under Title 35, United States Code, §119 (a)-(d) of Japanese Patent Application No. 2011-005107, filed on Jan. 13, 2011 in the Japan Patent Office, the disclosure of which is herein incorporated by reference in its entirety.

BACKGROUND OF THE INVENTION

1. Field of the Invention

The present invention relates to a conveyor chain in which lubricant oil is sealed in a raceway for a large number of bearing elements which are loosely inserted between a bush and a roller, serving as an inner and an outer race of the bearing in the link. More specifically, the invention relates to a conveyor chain for carrying and conveying heavy loads such as coils and slabs in the iron manufacturing field.

2. Related Art

A conveyor chain in which lubricant oil is sealed within a raceway in which a large number of bearing elements is loosely inserted between a bush and a roller of each link thereof is widely used as a conveyor chain for carrying and conveying heavy loads such as coils and slabs in the iron manufacturing field.

As shown in FIG. 11, such prior art conveyor chain 500 comprises, in each link thereof, a pair of inner link plates 510 separately disposed on right and left sides, a bush 520 press-fitted into bush holes 512 of these inner link plates 510, a roller 530 rotatably fitted around the bush 520, a link pin 540 inserted through the bush 520, a pair of right and left outer link plates 550 press-fitted to both ends of the link pin 540 and linking the adjoining inner link plates 510 mutually in a chain longitudinal direction, a plurality of bearing elements 560 loosely inserted between an outer circumferential surface 520a of the bush 520 and an inner circumferential surface 530a of the roller 530 and a pair of right and left thrust bearing annular members 570 press-fitted to the outer circumferential surface 520a of the bush 520 and disposed between an inner side surface 510a of the inner link plate 510 and end surfaces 560a of the bearing elements 560, and lubricant oil is sealed within the raceway for the bearing elements 560 as disclosed in U.S. Patent Publication No. 2003/0032511 [Japanese Patent No. 3719963].

In another example of a prior art conveyor chain shown in U.S. Pat. No. 6,742,935 [Japanese Patent No. 3563354], a thrust bearing annular member or retainer is disposed at both ends of a roller, grooves each having a semicircular shape in section, are formed respectively on an inner circumferential surface of the roller and an outer circumferential surface of the thrust bearing annular member between the roller and the thrust bearing annular member, the groove of the roller is vertically aligned with the groove of the thrust bearing annular member to form a void having a circular shape in section and an annular sealing member having a circular shape in section is disposed in this void substantially without gap (see FIG. 8c).

Problems to be Solved by the Invention

However, the prior art conveyor chain as described in the U.S. Patent Publication No. 2003/0032511 has a problem that because it has a gap between the bush and the thrust bearing annular member idly inserted to the bush, there is a possibility that the lubricant oil sealed within the bearing element raceway leaks out of this gap and dust and others enter from the outside through the gap.

It has also another problem that if a remaining amount of the lubricant oil sealed between the inner circumferential surface of the thrust bearing annular member and the end surfaces of the bearing elements decreases, contact resistance between the thrust bearing annular member and the bearing elements increases.

The chain as described in U.S. Pat. No. 6,742,935 also has a problem that because the annular sealing member is deformed in a chain width direction and slidingly contacts within the groove of the roller disposed substantially without gap when the roller moves in the chain width direction, there is a possibility that the annular sealing member may wear and damage the inner circumferential surface of the roller.

Still more, because the void between the roller and the thrust bearing annular member is small as compared to a diameter of a section of the annular sealing member, the prior art chain has a problem that it is cumbersome to assemble the annular sealing member to the thrust bearing annular member.

SUMMARY OF THE INVENTION

Accordingly, the present invention aims at solving the above-mentioned prior art problems by providing a conveyor chain constructed so as to prevent a leakage of lubricant oil to the outside, that is otherwise prone to occur, between an annular sealing member and a roller while avoiding the annular sealing member from wearing and damaging the inner circumferential surface of the roller, to prevent foreign matter from entering a bearing element raceway from the outside, to considerably reduce contact resistance between a thrust bearing annular member and bearing elements and to facilitate assembly of the annular sealing member to the thrust bearing annular member.

Means for Solving the Problems

In order to solve the aforementioned problems, according to a first aspect of the invention, there is provided a conveyor chain comprising, in each link thereof, a pair of inner link plates separately disposed on right and left sides, a bush press-fitted into bush holes of these inner link plates, a roller rotatably fitted around the bush, a link pin inserted through the bush, a pair of right and left outer link plates press-fitted to both ends of the link pin and linking the adjoining inner link plates mutually in a chain longitudinal direction, a plurality of bearing elements loosely inserted between an outer circumferential surface of the bush and an inner circumferential surface of the roller and a pair of right and left thrust bearing annular members press-fitted to the outer circumferential surface of the bush and disposed between an inner side surface of the inner link plate and end surfaces of the bearing elements, wherein lubricant oil is sealed within a raceway for the bearing elements and wherein an annular sealing member for sealing the lubricant oil within the raceway for the bearing elements is disposed between an inner circumferential surface of the roller and an outer circumferential surface of the thrust bearing annular member in a condition of slidably contacting with and of not being deformed by the inner circumferential surface of the roller.

According to a second aspect of the invention, the thrust bearing annular member has a seal-fitting annular groove into which an inner circumferential portion of the annular sealing member is fitted displaceably in the radial direction on the outer circumferential surface thereof.

According to a third aspect of the invention, the annular sealing member is formed so as to have an inner diameter which is larger than a bottom diameter of the seal-fitting annular groove and smaller than an outer diameter of the thrust bearing annular member.

According to a fourth aspect of the invention, the thrust bearing annular members are press-fitted into the outer circumferential surface of the bush at positions sandwiching the bearing elements while permitting the bearing elements to move slightly in the chain width direction and the roller has inner circumferential-side flanges that slidably contact with the annular sealing member in a condition of embracing the bearing elements while permitting the bearing elements to move slightly in the chain width direction.

According to a fifth aspect of the invention, the thrust bearing annular member has an oil reserving annular concave groove opening to end surfaces of the bearing elements at an inner side surface thereof.

According to a sixth aspect of the invention, the bush has an oil inlet for supplying the lubricant oil within the link pin to the bearing element raceway.

According to a seventh aspect of the invention, the annular sealing member is composed of an elastic body of synthetic resin.

According to an eighth aspect of the invention, the thrust bearing annular member is provided with a plurality of seal-fitting annular grooves that engage with the annular sealing members on an outer circumferential surface thereof.

Advantageous Effects of the Invention

Because the conveyor chain of the invention comprises, in each link thereof, the pair of inner link plates separately disposed on the right and left sides, the bush press-fitted into the bush holes of the inner link plates, the roller rotably fitted around the bush, the link pin inserted through the bush, the pair of right and left outer link plates press-fitted to the both ends of the link pin and the adjoining inner link plates mutually in the chain longitudinal direction, the plurality of bearing elements loosely inserted between the outer circumferential surface of the bush and the inner circumferential surface of the roller and the pair of right and left thrust bearing annular members press-fitted to the outer circumferential surface of the bush and disposed between the inner side surface of the inner link plate and the end surfaces of the bearing elements, and lubricant oil is sealed within the raceway for the bearing elements, the bearing element raceway is put into a condition filled with the lubricant oil and the roller can smoothly rotates through the plurality of bearing elements. The conveyor chain also brings about the following effects peculiar to the invention.

That is, according to the first aspect of the conveyor chain of the invention, because the annular sealing member for sealing the lubricant oil within the raceway for the bearing elements is disposed between the inner circumferential surface of the roller and the outer circumferential surface of the thrust bearing annular member in the condition of slidably contacting with and of not being deformed by the inner circumferential surface of the roller, the annular sealing member seals between the inner circumferential surface of the roller and the outer circumferential surface of the thrust bearing annular member securely in the slidable-contact condition without wearing or damaging the inner circumferential surface of the roller. Thus, the annular sealing member can prevent the lubricant oil fed within the bearing element raceway from leaking to the outside and can prevent foreign matter from entering the bearing element raceway from the outside.

According to the second aspect of the conveyor chain of the invention, because the thrust bearing annular member has the seal-fitting annular groove into which the inner circumferential portion of the annular sealing member is fitted displaceably in the radial direction on the outer circumferential surface thereof and the inner circumferential portion of the annular sealing member is displaceable in the radial direction within the seal-fitting annular groove of the thrust bearing annular member, the annular sealing member slidably contacts with the inner circumferential surface of the roller with non-load, i.e., in a so-called zero-touch condition, even when the roller rotates eccentrically in the radial direction with respect to the bush in conveying the heavy loads.

Therefore, it becomes possible to prevent the lubricant oil from leaking to the outside, which is otherwise prone to occur, between the annular sealing member and the roller while avoiding to wear and damage the inner circumferential surface of the roller.

Still more, a relief structure or a so-called labyrinth structure is brought about by the inner circumferential portion of the annular sealing member and the groove wall part of the seal-fitting annular groove, so that it becomes possible to prevent the lubricant oil from leaking to the outside, which is prone to occur, between the annular sealing member and the thrust bearing annular member.

According to the third aspect of the conveyor chain of the invention, because the annular sealing member is formed so as to have the inner diameter which is larger than the bottom diameter of the seal-fitting annular groove and smaller than the outer diameter of the thrust bearing annular member and the annular sealing member is always engaged with the seal-fitting annular groove, it becomes possible to prevent the annular sealing member from unintentionally falling out of the thrust bearing annular member even when the roller rotates eccentrically in the radial direction with respect to the bush or when the roller or the bearing elements rotate in a skew condition with respect to the bush.

According to the fourth aspect of the conveyor chain of the invention, because the thrust bearing annular members are press-fitted into the outer circumferential surface of the bush at positions sandwiching the bearing elements while permitting the bearing elements to move slightly in the chain width direction and the roller has inner circumferential-side flanges that slidably contact with the annular sealing member in a condition of embracing the bearing elements while permitting the bearing elements to move slightly in the chain width direction, the pair of right and left thrust bearing annular members and the pair of right and left inner circumferential-side flanges spread the lubricant oil sealed within the raceway for the bearing elements in every corner of the area without unevenly distributing it by permitting the bearing elements to move slightly in the chain width direction. Accordingly, it becomes possible to smoothly achieve rolling contact between the bush and bearing elements and between the roller and the bush.

According to the fifth aspect of the of the invention, because the thrust bearing annular member has the oil reserving annular concave groove opening to the end surface of the bearing element at the inner side surface thereof, the lubricant oil temporarily reserved within the inner side surface is supplied to the end surface of the bearing elements corresponding to conditions of an amount of the lubricant oil at the end surface of the bearing elements. Accordingly, it becomes possible to considerably reduce contact resistance in the chain width direction, i.e., a so-called thrust direction, between the inner side surface of the thrust bearing annular member and the end surface of the bearing elements.

According to the sixth aspect of the conveyor chain of the invention, because the bush has the oil inlet for supplying the lubricant oil within the link pin to the bearing element raceway and the lubricant oil retained within the link pin is supplied to the bearing element raceway through the oil inlet, it becomes possible to keep rolling contact between the bush and the bearing elements and between the roller and the bush for a long period of time without maintenance.

According to the seventh aspect of the conveyor chain of the invention, because the annular sealing member is composed of the elastic body of synthetic resin, is liable to be elastically deformed and exhibits self-lubricity, the annular sealing member can prevent the lubricant oil from leaking to the outside, which is otherwise prone to occur, between the annular sealing member and the roller further while avoiding to wear and damage the inner circumferential surface of the roller by bringing about a zero-touch condition to the inner circumferential surface of the roller even when the roller rotates in the condition eccentric in the radial direction with respect to the bush. The annular sealing member can be also easily assembled to the thrust bearing annular member.

According to the eighth aspect of the conveyor chain of the invention, because the thrust bearing annular member is provided with the plurality of seal-fitting annular grooves that engage with the annular sealing members on an outer circumferential surface thereof and the plurality of annular sealing members steadily seal between the inner circumferential surface of the roller and the outer circumferential surface of the thrust bearing annular member further in the slidable contact condition without wearing or damaging the inner circumferential surface of the roller, the annular sealing members can steadily prevent the lubricant oil supplied within the bearing element raceway from leaking to the outside and can steadily prevent foreign matter from entering the bearing element raceway from the outside.

BEST MODE FOR CARRYING OUT THE INVENTION

First Embodiment

A first embodiment of a conveyor chain 100 of the invention will be explained below with reference to FIGS. 1 through 5.

Figure 1:
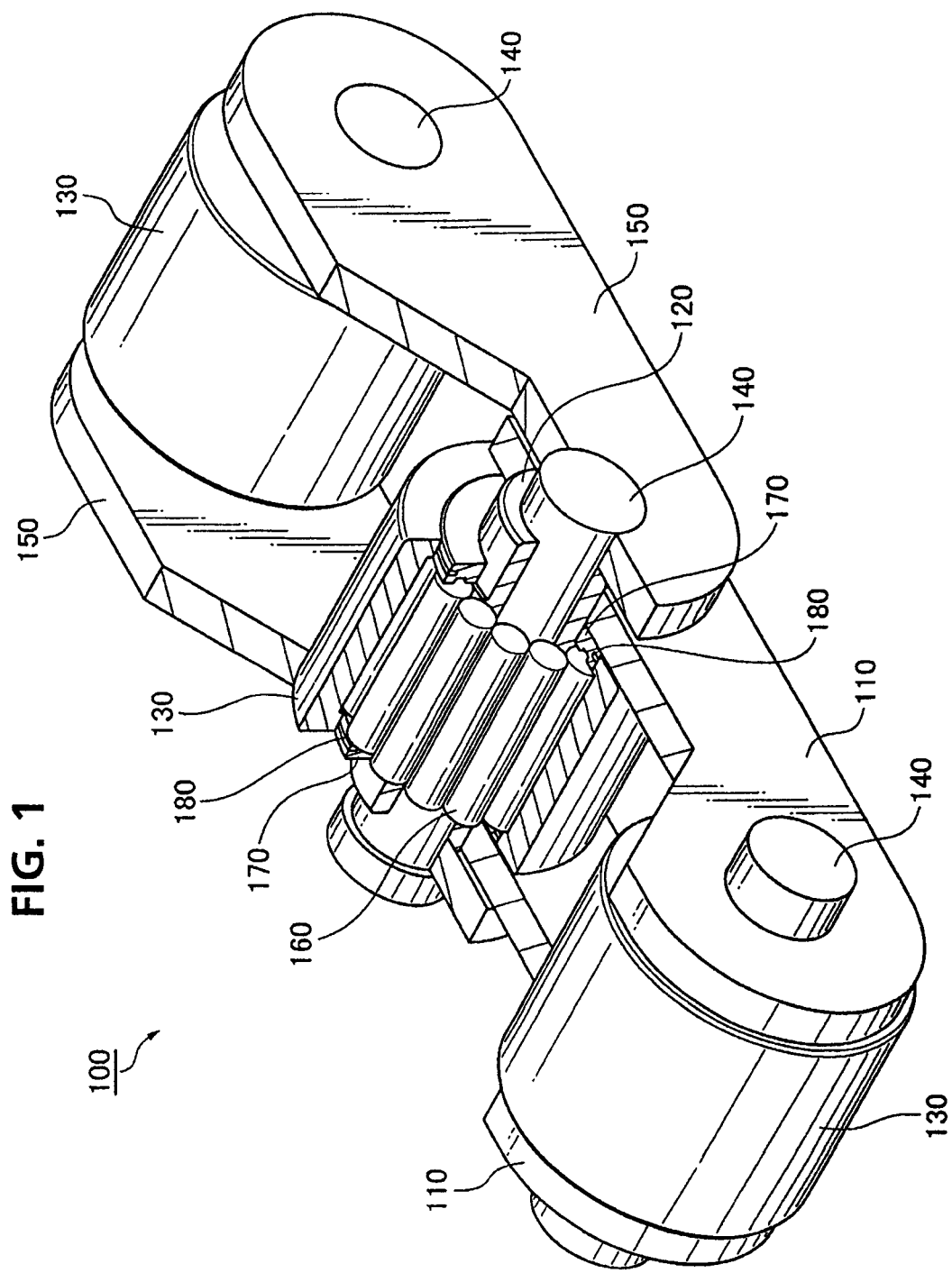
FIG. 1 is an overall schematic drawing partially cut-away of each link of a conveyor chain of a first embodiment of the invention.
Figure 2:
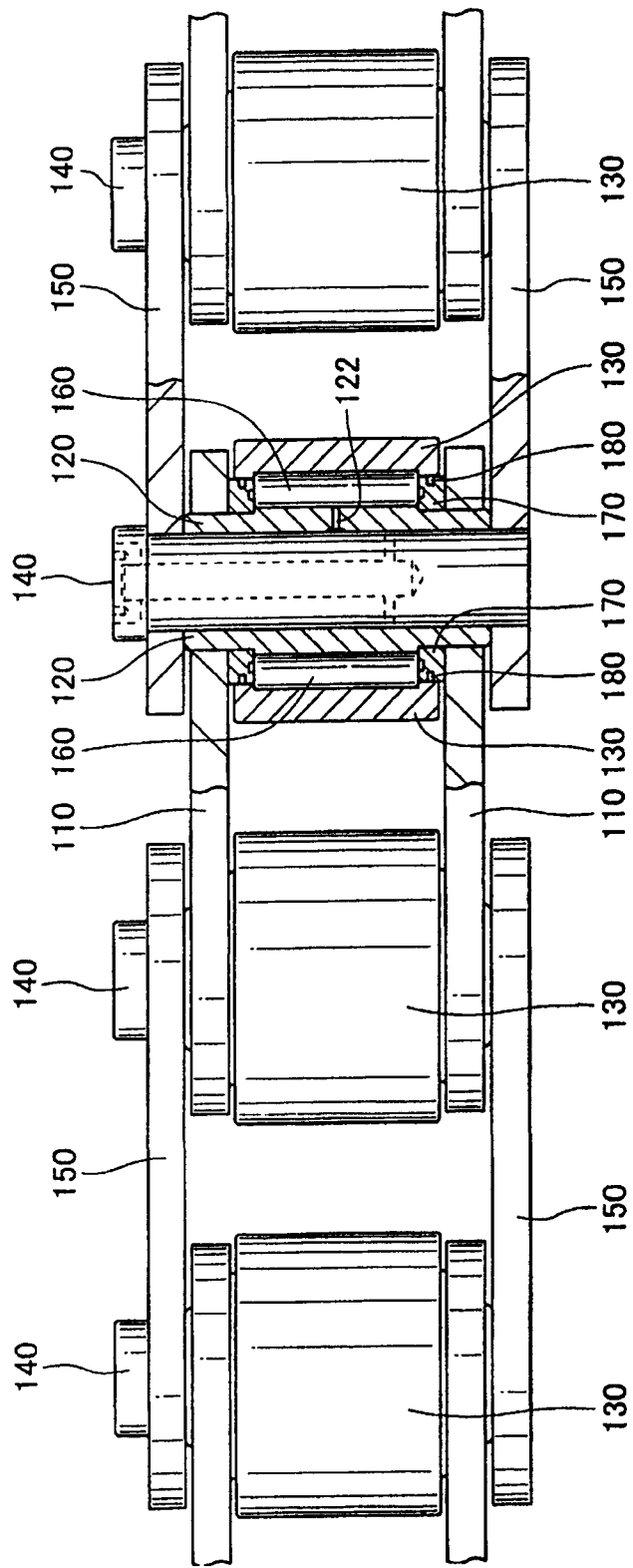
FIG. 2 is a plan view, partially in section, of the conveyor chain shown in FIG. 1.
Figure 3:
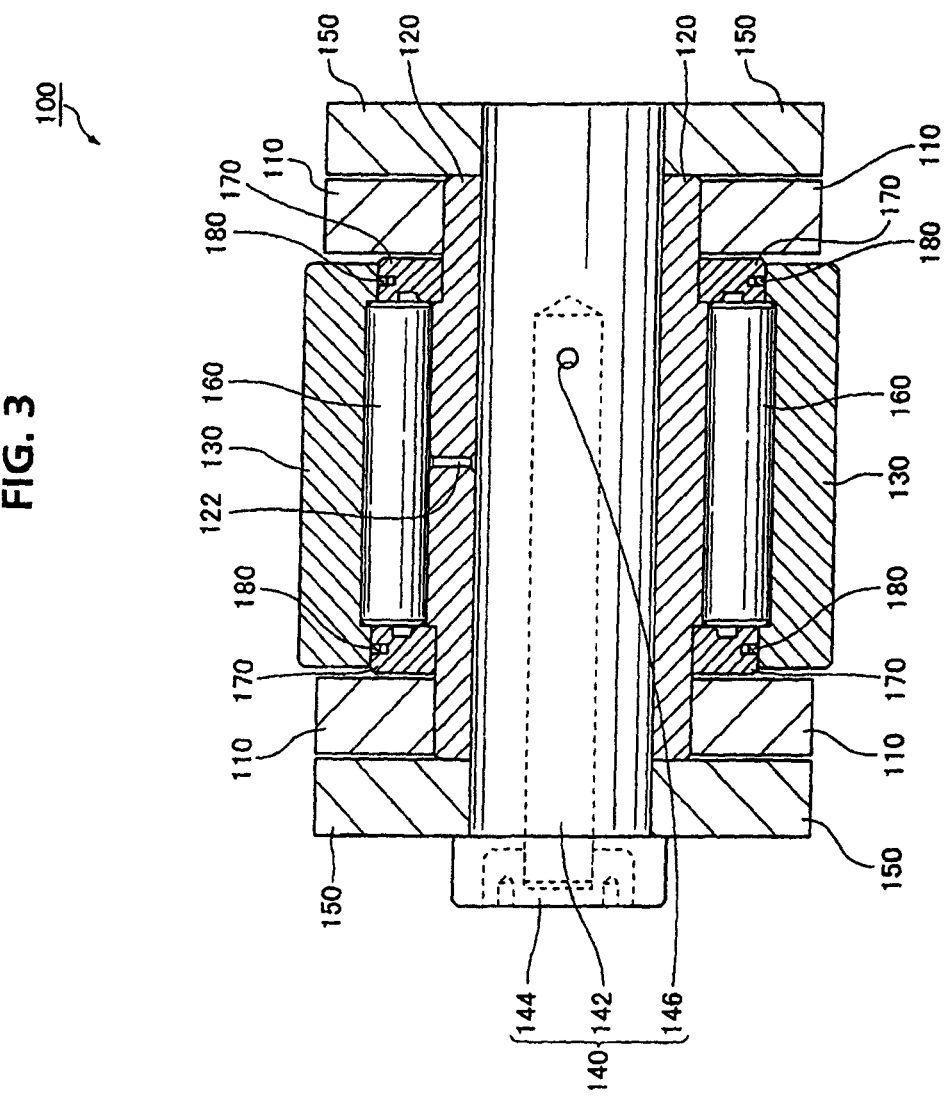
FIG. 3 is an enlarged section view of a link of the conveyor chain shown in FIG. 2.

The conveyor chain 100 of the first embodiment of the invention is used to carry and convey heavy loads such as coils and slabs in the iron manufacturing field in particular and comprises, in each link thereof as shown in FIGS. 1 through 3, a pair of inner link plates 110 separately disposed on right and left sides, a bush 120 press-fitted into bush holes 112 of these inner link plates 110, a roller 130 rotatably fitted around the bush 120, a link pin 140 inserted through the bush 120, a pair of right and left outer link plates 150 press-fitted to both ends of the link pin 140 and linking the adjoining inner link plates 110 mutually in a chain longitudinal direction, a plurality of bearing elements 160 loosely inserted between an outer circumferential surface 120a of the bush 120 and an inner circumferential surface 130a of the roller 130 and a pair of right and left thrust bearing annular members 170 at opposite ends of the raceway for the bearing elements 160. The members 170 are press-fitted to the outer circumferential surface 120a of the bush 120 and disposed between an inner side surface 110a of the inner link plate 110 and end surfaces 160a of the bearing elements 160, and lubricant oil is sealed within a raceway for the bearing elements 160 described above.

Then, as shown in FIGS. 2 and 3, the link pin 140 described above has an oil reservoir 142 formed therein for reserving the lubricant oil. Because one end of the oil reservoir 142 is sealed by a lid 144, the lubricant oil is supplied from the oil reservoir 142 between an inner circumferential surface of the bush 120 and an outer circumferential surface of the link pin 140 via an oil passage 146.

Still more, the bush 120 has an oil inlet 122 formed near the center thereof in a bush longitudinal direction for feeding the lubricant oil supplied from the link pin 140 to the raceway for the bearing elements 160.

Thereby, the lubricant oil held within the link pin 140 is fed to the raceway for the plurality of bearing elements 160 via the oil inlet 122.

Next, specific configurations of a thrust bearing annular member 170 and an annular sealing member 180, which are the most characteristic parts of the conveyor chain of the first embodiment of the invention, will be explained below in detail.

Firstly, as shown in FIGS. 1 through 4, the annular sealing member 180 having a rectangular shape in section for sealing the lubricant oil within the raceway for the bearing elements 160 is disposed between an inner circumferential surface 130a of the roller 130 and an outer circumferential surface 170a of the thrust bearing annular member 170 in a condition of slidably contacting with and of not being deformed by the inner circumferential surface 130a of the roller 130.

The annular sealing member 180 is composed of an elastic body of synthetic resin.

Thereby, the annular sealing member 180 seals between the inner circumferential surface 130a of the roller 130 and the outer circumferential surface 170a of the thrust bearing annular member 170 securely in the slidable-contact condition without wearing or damaging the inner circumferential surface 130a of the roller 130. It is also liable to be elastically deformed and exhibits self-lubricant property.

It is noted that the thrust bearing annular member 170 is composed of a material excellent in low frictionality and high wear resistance such as synthetic resin such as fluorine resin, polyamide resin and others, oil-impregnated sintered metal, ceramics and others.

Still more, the annular sealing member 180 is formed so as to have an inner diameter which is larger than a bottom diameter of the seal-fitting annular groove 172, i.e., the diameter of a bottom surface formed in the seal-fitting annular groove 172, and which is smaller than an outer diameter of the thrust bearing annular member 170.

Thereby, the annular sealing member 180 always engages with the seal-fitting annular groove 172.

The thrust bearing annular member 170 has the seal-fitting annular groove 172 into which an inner circumferential portion 180b of the annular sealing member 180 is fitted displaceably in the radial direction on the outer circumferential surface 170a thereof.

Thereby, the inner circumferential portion 180b of the annular sealing member 180 is displaceable in the radial direction within the seal-fitting annular groove 172 of the thrust bearing annular member 170.

Still more, the thrust bearing annular members 170 are press-fitted onto the outer circumferential surface 120a of the bush 120 at positions sandwiching the bearing elements 160 while permitting the bearing elements 160 to move slightly in the chain width direction, and the roller 130 has inner circumferential-side flanges 132 that slidably contact with the annular sealing member 180 in a condition of embracing the bearing elements 160 while permitting the bearing elements 160 to move slightly in the chain width direction.

Thereby, the pair of right and left thrust bearing annular members 170 and the pair of right and left inner circumferential-side flanges 132 spread the lubricant oil sealed within the raceway for the bearing elements 160 in every corner of the area without unevenly distributing it by permitting the bearing elements 160 to move slightly in the chain width direction.

Still more, each thrust bearing annular member 170 has an oil reserving annular concave groove 174 opening to the end surface 160a of the bearing element 160 at an inner side surface 170b thereof.

Thereby, the lubricant oil temporarily reserved within the inner side surface 170b is supplied to the end surface 160a of the bearing element 160 corresponding to conditions of an amount of the lubricant oil at the end surface 160a of the bearing element 160.

Figure 4:
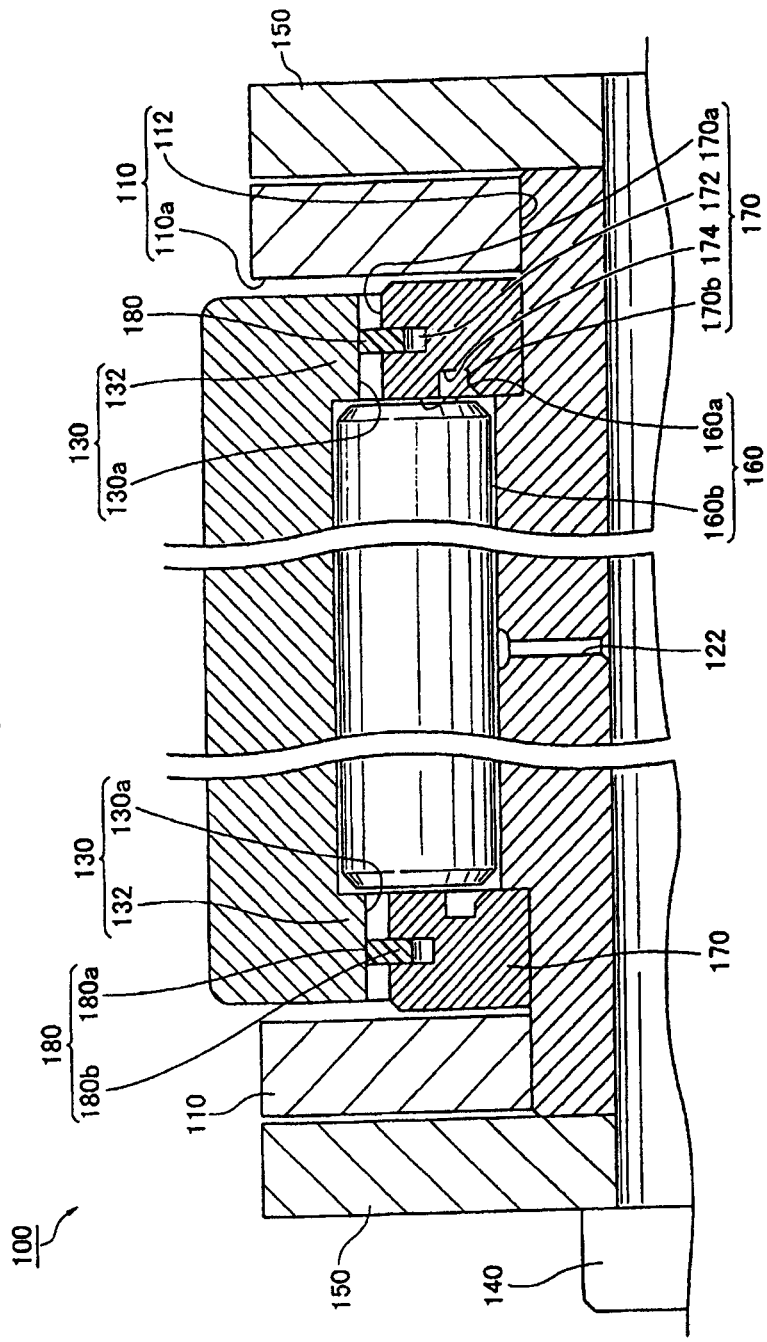
FIG. 4 is a further enlarged section view of the link of the conveyor chain shown in FIG. 3.
Figure 5:
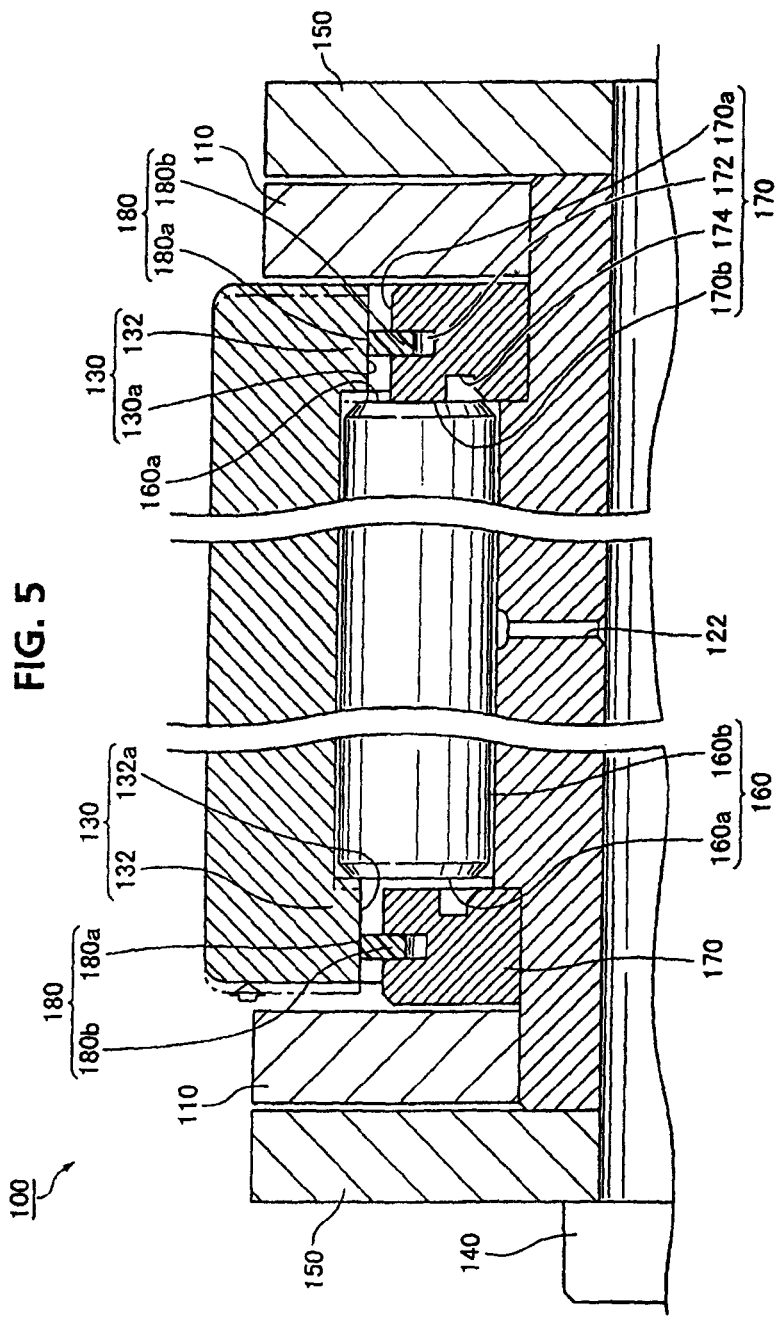
FIG. 5 is a view similar to FIG. 4 showing a condition in which a roller shown in FIG. 4 is eccentrically located in a thrust direction.

Next, actions of the roller 130 in moving in the thrust direction with respect to the annular sealing member 180 will be explained in detail with reference to FIGS. 4 and 5. At first, the roller 130 moves toward the right side in FIG. 5 by external force acting in the direction of an arrow in FIG. 5. Next, the inner flange portion 132 of the roller 130 formed on the left side in the drawing butts against the end surface 160a of the bearing element 160 on the left side in the drawing and pushes the bearing element 160 toward the right side in the drawing. After that, the end surface 160a of the bearing element 160 on the right side in the drawing butts against the inner side surface 170b of the thrust bearing annular member 170 and then the moves of the roller 130 and the bearing element 160 in the thrust direction end. The outer circumferential surface 180a of the annular sealing member 180 is not deformed by the inner circumferential surface 130a of the roller 130 in the series of actions described above and always keeps the no-loaded slidable contact condition or the so-called zero-touch condition. It is noted that the roller 130 and the bearing element 160 move in a direction symmetrical from the series of actions described above when external force in a direction opposite from the direction of the arrow shown in FIG. 5 acts on the roller 130.

Figure 6:
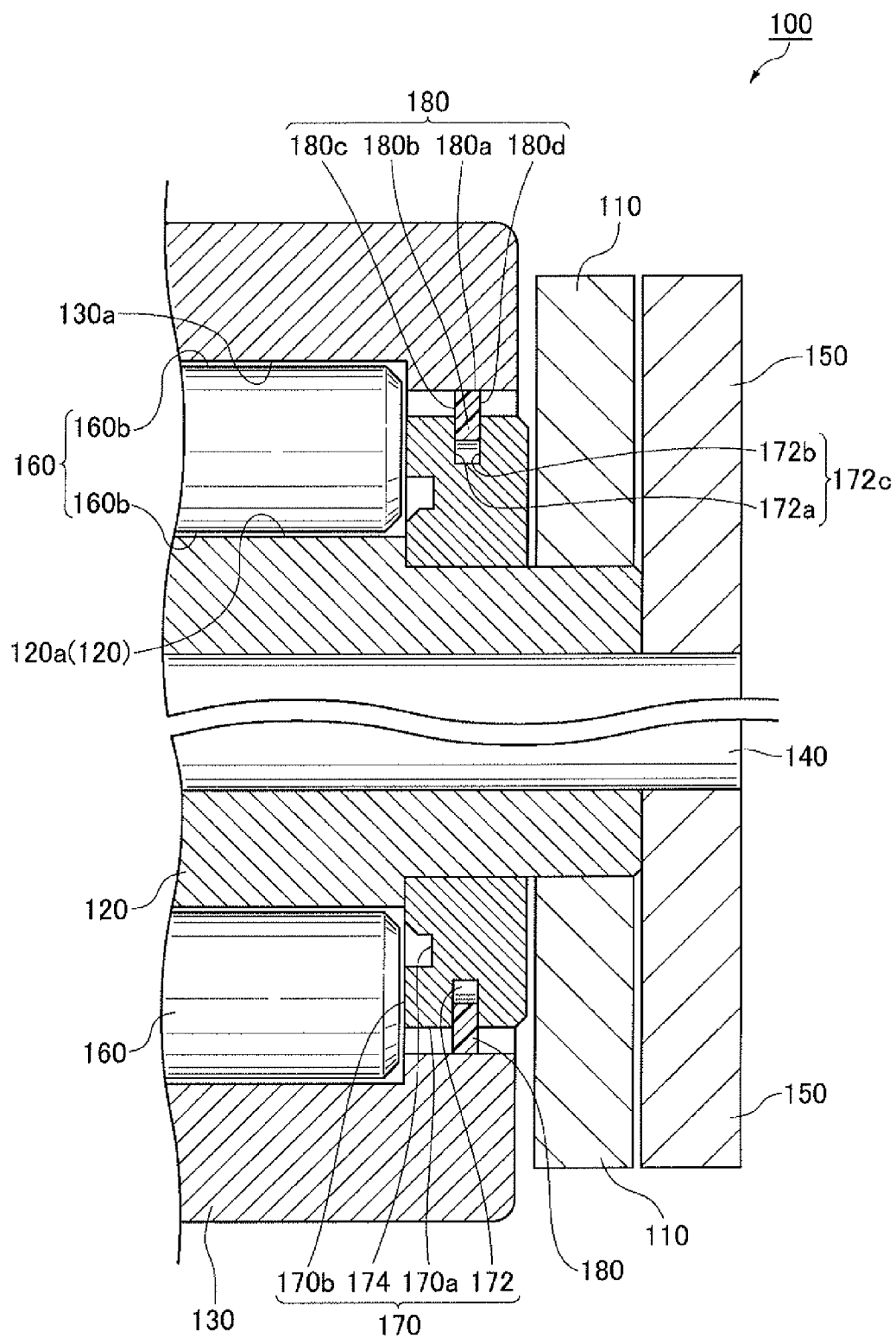
FIG. 6 is a further enlarged section view with a portion broken away of the link of the conveyor chain shown in FIG. 3.

Next, actions of the roller 130 in moving in the radial direction with respect to the annular sealing member 180 will be explained in detail with reference to FIGS. 6 and 7. At first, the roller 130 pushes the annular sealing member 180 downward in FIG. 7 by external force acting in a direction of an arrow in the drawing. At this time, a center axis of the annular sealing member 180 is decentralized with respect to a center axis of the thrust bearing annular member 170 and the annular sealing member 180 moves downward in the drawing. The annular sealing member 180 is movable in the radial direction until the outer circumferential surface 160b of one of bearing element 160 butts against the inner circumferential surface 130a of the roller 130 at the bottom of the drawing, and the outer circumferential surface 120a of the bush 120 in the upper part of the drawing.

In the series of actions described above, an inner side surface 180c of the annular sealing member 180 slidably contacts with the inner wall surface 172a of the seal-fitting annular groove 172 and an outer side surface 180d of the annular sealing member 180 slidably contacts with an outer wall surface 172b of the seal-fitting annular groove 172.

Figure 7:
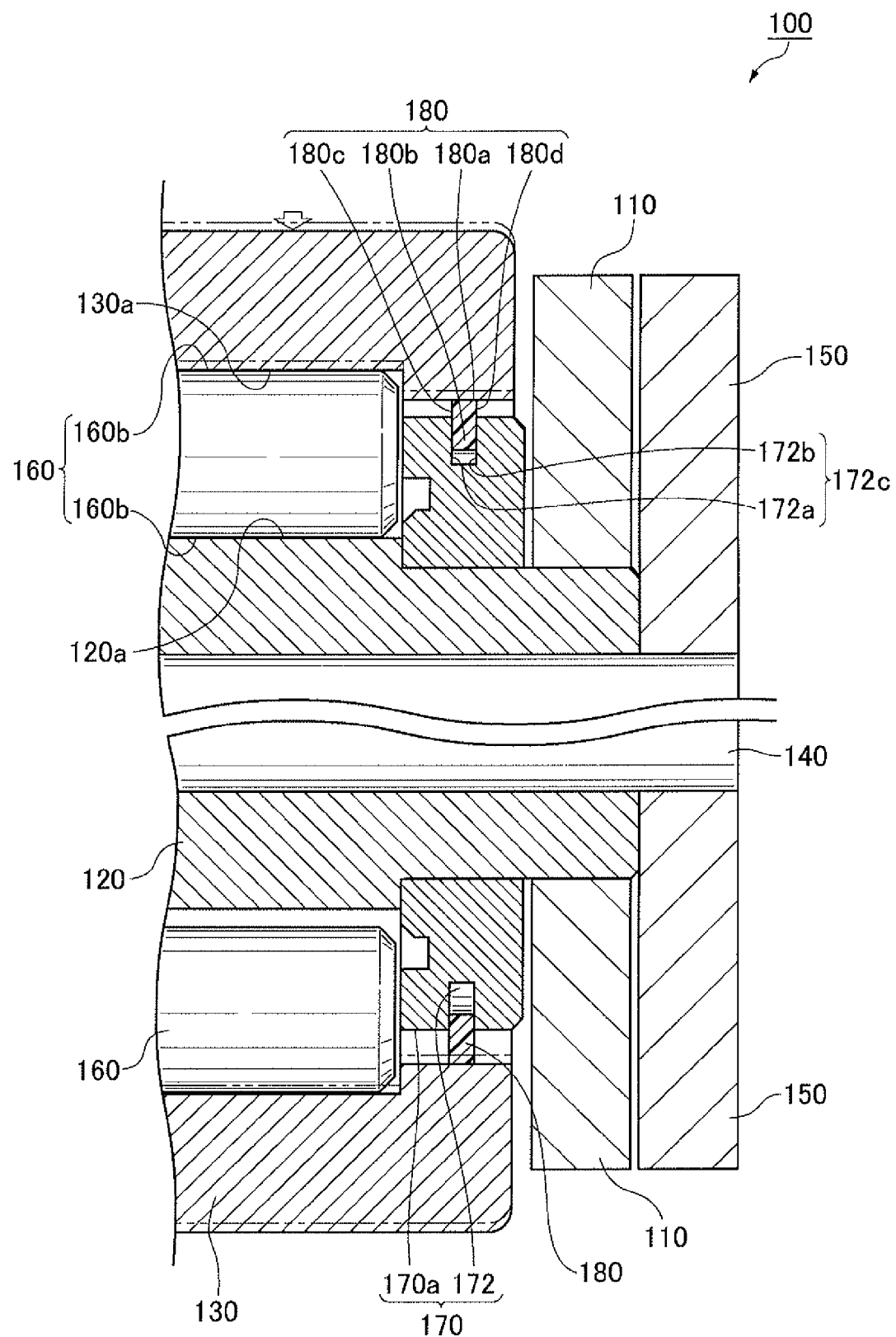
FIG. 7 is a view similar to FIG. 6 showing a condition in which the roller shown in FIG. 6 is eccentrically located in a radial direction.

It is noted that the roller 130 moves in a direction vertically symmetrical from the series of actions described above when external force in a direction opposite from the direction of the arrow in FIG. 7.

As described above, because the conveyor chain 100 of the present embodiment thus constructed comprises the plurality of bearing elements 160 loosely inserted between the outer circumferential surface 120a of the bush 120 and the inner circumferential surface 130a of the roller 130 and the pair of right and left thrust bearing annular members 170 press-fitted into the outer circumferential surface 120a of the bush 120 and disposed between the inner side surface 110a of the inner link plate 110 and the end surface 160a of the bearing element 160 (See FIGS. 4 and 5), the lubricant oil is sealed within the raceway for the bearing elements 160. The annular sealing member 180 for sealing the lubricant oil within the raceway for the bearing elements 160 is disposed between the inner circumferential surface 130a of the roller 130 and the outer circumferential surface 170a of the thrust bearing annular member 170 in the condition of slidably contacting with and of not being deformed by the inner circumferential surface 130a of the roller 130. Accordingly, the annular sealing member 180 can prevent the lubricant oil fed into the bearing element raceway from leaking to the outside and can prevent foreign matter from entering to the bearing element raceway from the outside.

Still more, because the thrust bearing annular member 170 has the seal-fitting annular groove 172 fitting the inner circumferential portion 180b of the annular sealing member 180 displaceably in the radial direction on the outer circumferential surface 170a thereof, the annular sealing member 180 can prevent the lubricant oil from leaking to the outside, which is otherwise prone to occur, between the annular sealing member 180 and the roller 130 while avoiding to wear and damage the inner circumferential surface 130a of the roller 130 by bringing about the zero-touch condition to the inner circumferential surface 130a of the roller 130 even when the roller 130 rotates in the condition eccentric in the radial direction with respect to the bush 120. The annular sealing member 180 can also prevent the lubricant oil from leaking to the outside, which is otherwise prone to occur, between the annular sealing member 180 and the groove wall portions 172c of the seal-fitting annular groove 172 by bringing about the labyrinth structure by the inner circumferential portion 180b of the annular sealing member 180 and the groove wall portions 172c of the seal-fitting annular groove 172.

Still more, because the thrust bearing annular members 170 are press-fitted into the outer circumferential surface 120a of the bush 120 at the positions sandwiching the bearing elements 160 while permitting the bearing elements 160 to move slightly in the chain width direction and the roller 130 has the inner circumferential-side flanges 132 that slidably contact with the annular sealing member 180 in the condition of embracing the bearing elements 160 while permitting the bearing elements 160 to move slightly in the chain width direction, it becomes possible to smoothly achieve the rolling contact between the bush 120 and bearing elements 160 and between the roller 130 and the bush 120.

Still more, because the thrust bearing annular member 170 has the oil reserving annular concave groove 174 opening to the end surface 160a of the bearing element 160 at the inner side surface 170b thereof, it becomes possible to considerably reduce the contact resistance in the thrust direction between the inner side surface 170b of the thrust bearing annular member 170 and the end surface 160a of the bearing element 160.

Then, the annular sealing member 180 is composed of the elastic body of synthetic resin and the inner diameter thereof is formed to be larger than the bottom diameter of the seal-fitting annular groove 172 and to be smaller than the outer diameter of the thrust bearing annular member 170, the annular sealing member 180 can prevent the lubricant oil from leaking to the outside, which is otherwise prone to occur, between the annular sealing member 180 and the roller 130 while avoiding to wear and damage the inner circumferential surface 130a of the roller 130 by bringing about the zero-touch condition to the inner circumferential surface 130a of the roller 130 even when the roller 130 rotates in the condition eccentric in the radial direction with respect to the bush 120. The annular sealing member 180 can be assembled readily to the thrust bearing annular member 170 and can prevent the annular sealing member 180 from unintentionally falling out of the thrust bearing annular member 170 even when the roller 130 rotates in the condition eccentrically in the radial direction with respect to the bush 120 or when the bush 120 or the bearing element 160 rotates in the skew condition with respect to the bush 120. Thus, the advantageous effects thereof are remarkable.

By designing the sealing element 180 with an inside diameter which sized between the outer diameter of the annular member 170, and the diameter of the bottom of the groove 172, the seal is not lost when the roller 130 moves eccentrically to the bush 120.

Second Embodiment

Figure 8:
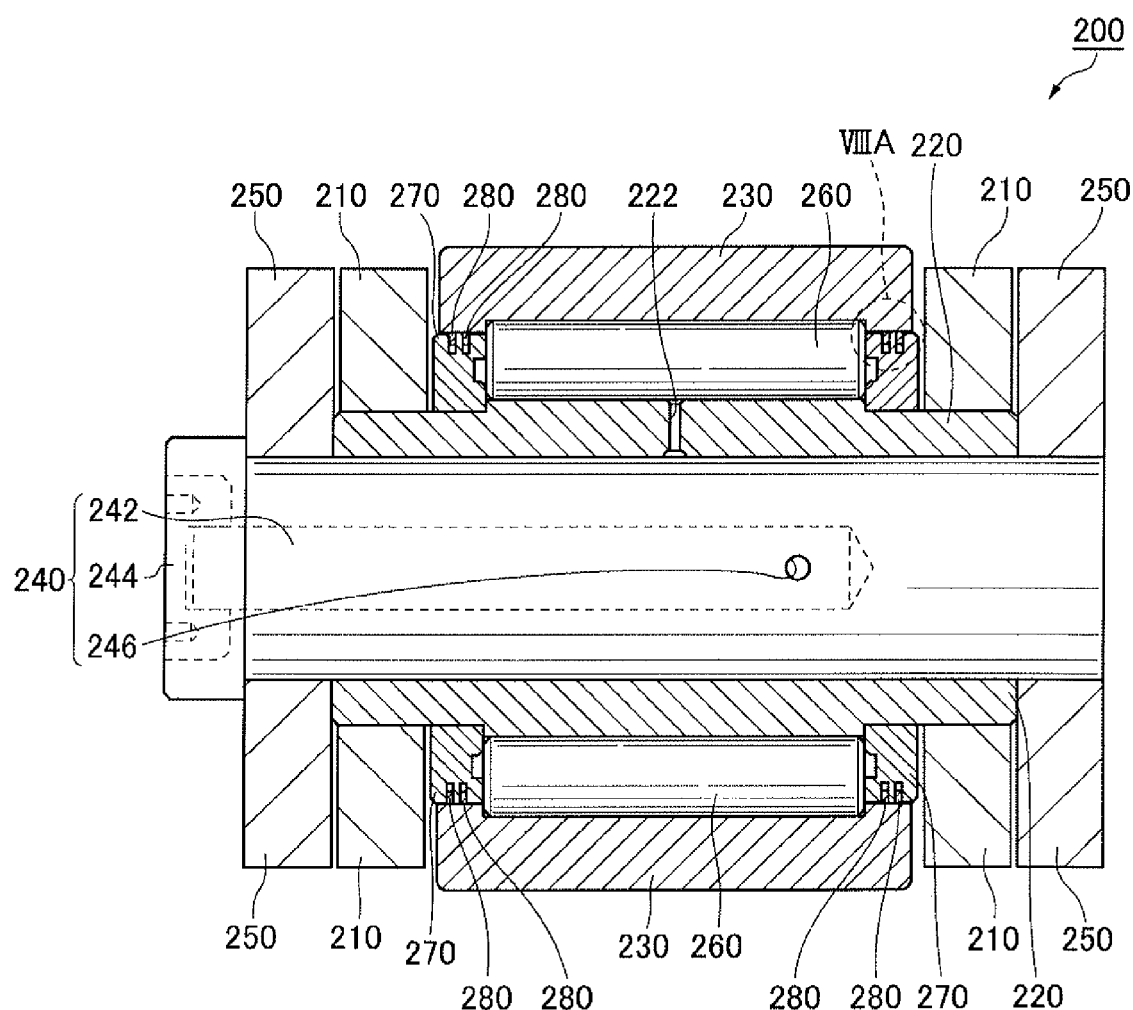
FIG. 8 is a section view with an enlarged section view of a link of a conveyor chain of a second embodiment of the invention.
Figure 8A:
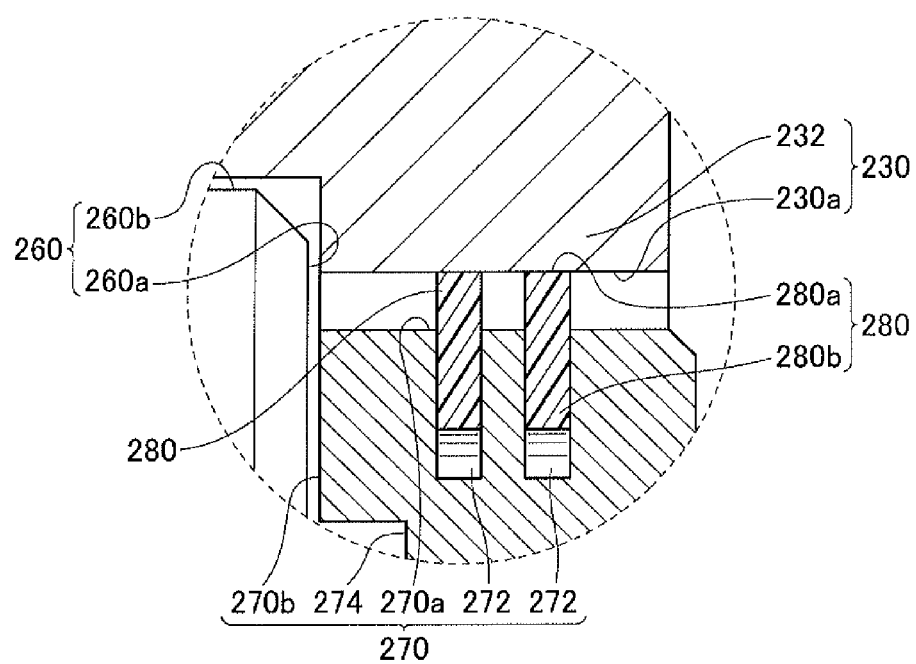
FIG. 8A is an enlarged section view of the seal encircled at VIIIA in FIG. 8.

Next, a conveyor chain 200 of a second embodiment of the invention will be explained with reference to FIGS. 8 and 8A. Same or corresponding parts of the conveyor chain 200 shown in these figures with those of the conveyor chain 100 of the first embodiment described above will be denoted by corresponding reference numerals in 200's and their repeated explanation will be omitted here.

Here, a specific configuration of a thrust bearing annular member 270 which is the most characteristic part of the conveyor chain 200 of the second embodiment of the invention will be explained in detail. That is, the pair of right and left thrust bearing annular members 270 is provided with two right and left rows of seal-fitting annular grooves, respectively, on outer circumferential surfaces 270a thereof. Then, one annular sealing member 280 is disposed in each seal-fitting annular groove 272. Thereby, the plurality of annular sealing members 280 seals between an inner circumferential surface 230a of the roller 230 and an outer circumferential surface 270a of the thrust bearing annular member 270 more securely without wearing or damaging the inner circumferential surface 230a of the roller 230.

The annular sealing members 280 of the conveyor chain 200 of the second embodiment obtained as described above can reliably prevent the lubricant oil supplied within the bearing element raceway from leaking to the outside and can prevent foreign matter from entering the raceway from the outside in addition to the advantageous effects brought about by the first embodiment by providing the seal-fitting annular grooves 272 on the outer circumferential surfaces 270a of the pair of right and left thrust bearing annular members 270 in addition to the configuration of the conveyor chain 100 of the first embodiment described above.

Third Embodiment

Figure 9:
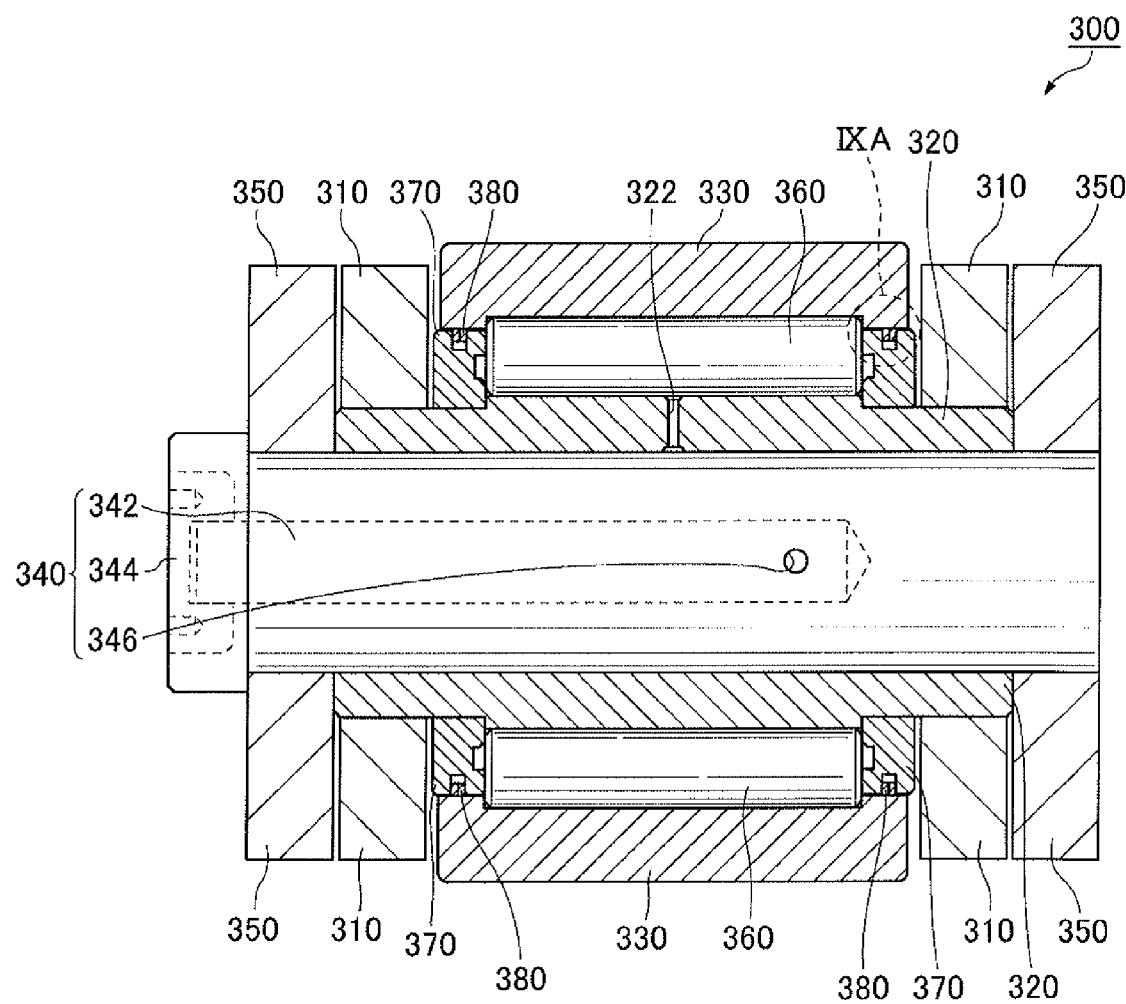
FIG. 9 is a section view with an enlarged section view of a main part of each link of a conveyor chain of a third embodiment of the invention.
Figure 9A:
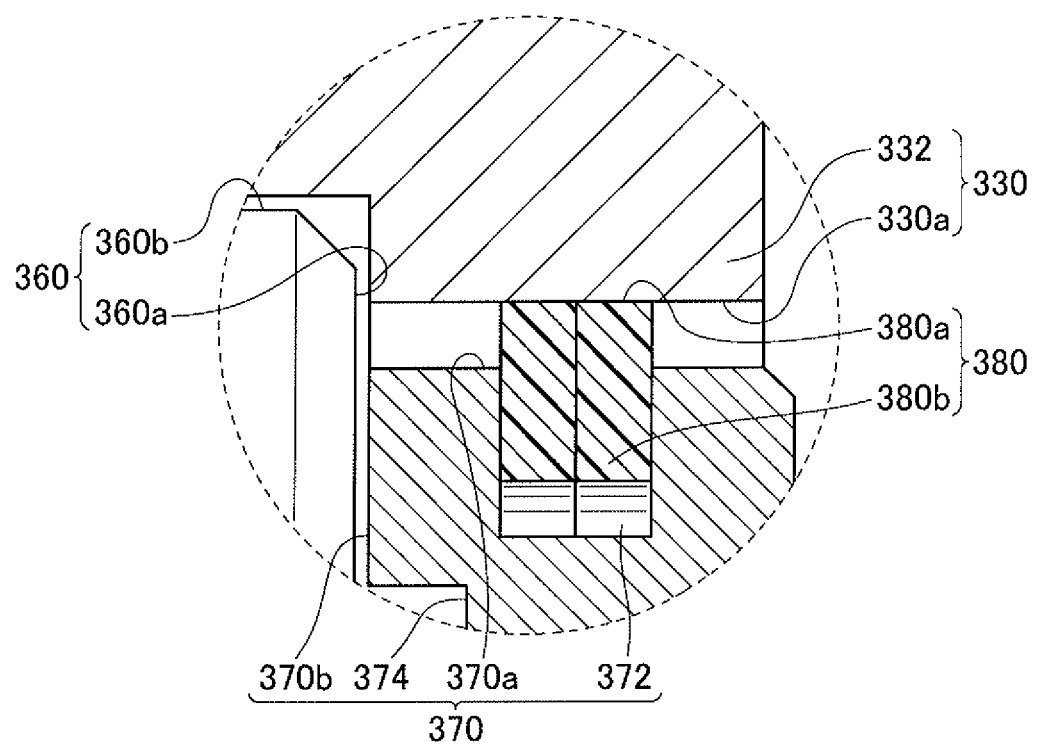
FIG. 9A an enlarged section view of the seal encircled at IXA in FIG. 9.
Figure 10:
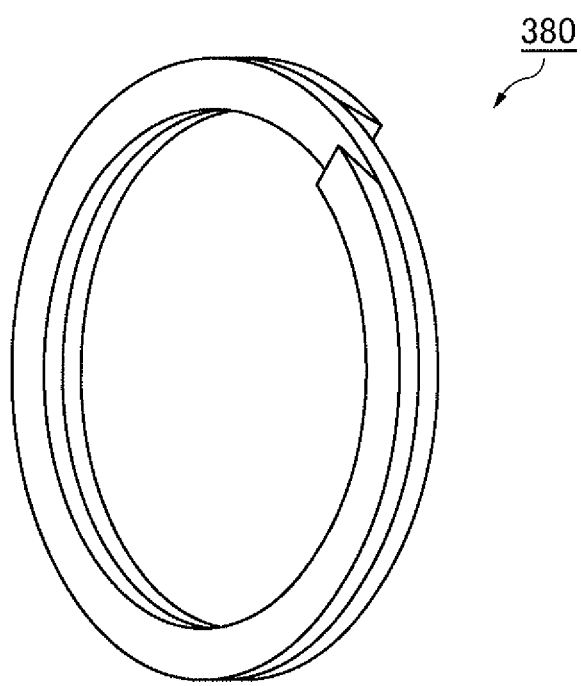
FIG. 10 is a perspective view of an annular sealing member used in the third embodiment shown in FIG. 9.
Figure 11:
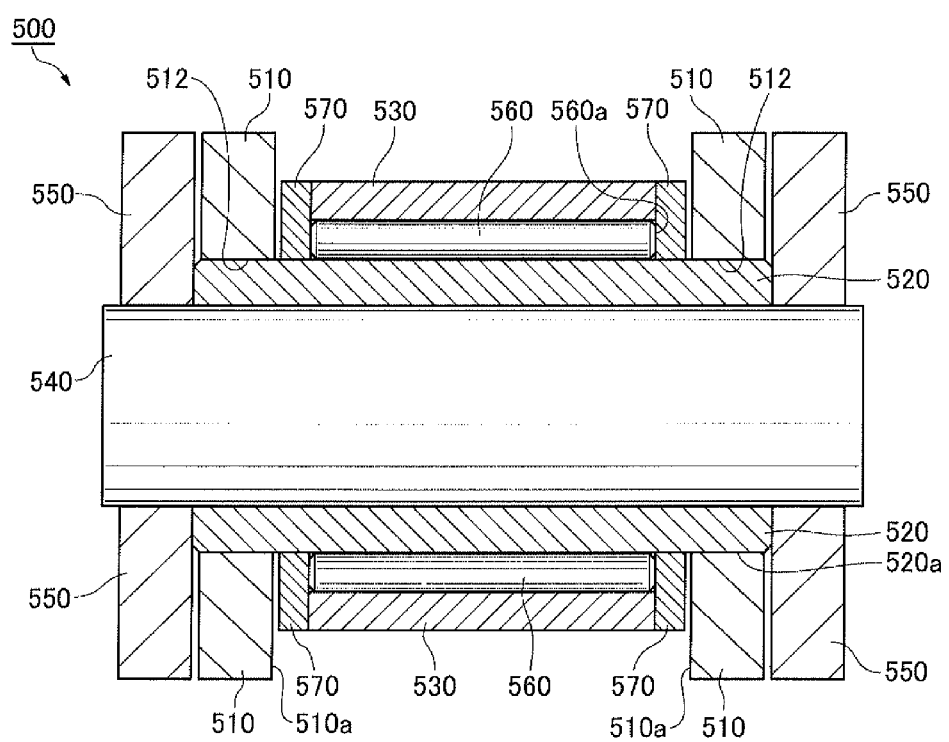
FIG. 11 is a section view showing each link of a prior art conveyor chain.

Next, a conveyor chain 300 of a third embodiment of the invention will be explained with reference to FIGS. 9 and 9A are section views of each link of the conveyor chain 300 of the third embodiment of the invention and FIG. 10 is a perspective view of an annular sealing member used in the third embodiment shown in FIGS. 9 and 9A.

Same or corresponding parts of the conveyor chain 300 shown in FIG. 9 with those of the conveyor chain 100 of the first embodiment described above will be denoted by corresponding reference numerals in 300s and their repeated explanation will be omitted here.

A specific configuration of an annular sealing member 380 which is the most characteristic part of the conveyor chain 300 of the third embodiment of the invention will be explained in detail. That is, the annular sealing member 380 is formed spirally around the whole circumference of the seal-fitting annular groove 172. The outer diameter of the annular sealing member 380 formed spirally can be contracted more than an inner diameter of the roller 330 and an area where the inner circumferential surface 330a of the roller 330 slidably contacts with an outer circumferential surface 380a of the spirally formed annular sealing member 380 extends widely in the thrust direction.

The annular sealing member 380 of the conveyor chain 300 of the third embodiment obtained as described above can be readily inserted and fitted in the roller 330 and can reliably seal the lubricant oil supplied within the bearing element raceway in addition to the advantageous effects brought about by the first embodiment by providing the annular sealing member 380 across the whole circumference of the seal-fitting annular groove 172 in addition to the configuration of the conveyor chain 100 of the first embodiment described above.

The specific mode of the conveyor chain of the present invention may take any mode as long as the conveyor chain comprises, in each link thereof, the pair of inner link plates separately disposed on the right and left sides, the bush press-fitted into the bush holes of the inner link plates, the roller rotatably fitted around the bush, the link pin inserted through the bush, the pair of right and left outer link plates press-fitted to the both ends of the link pin and linking the adjoining inner link plates mutually in the chain longitudinal direction, the plurality of bearing elements loosely inserted between the outer circumferential surface of the bush and the inner circumferential surface of the roller and the pair of right and left thrust bearing annular members press-fitted to the outer circumferential surface of the bush and disposed between the inner side surface of the inner link plate and the end surfaces of the bearing elements, wherein lubricant oil is sealed within the raceway for the bearing elements, the annular sealing member for sealing the lubricant oil within the raceway for the bearing elements is disposed between the inner circumferential surface of the roller and the outer circumferential surface of the thrust bearing annular member in the condition of slidably contacting with and of not being deformed by the inner circumferential surface of the roller.

The annular sealing member prevents the lubricant oil from leaking to the outside, which is prone to occur, between the annular sealing member and the roller and prevents the foreign matter from entering the hearing element raceway while avoiding wearing or damaging the inner circumferential surface of the roller. Thereby, the contact resistance of the thrust bearing annular member and the bearing elements is considerably reduced and the annular sealing member can be easily assembled to the thrust bearing annular member.

The annular sealing member used in the conveyor chain of the invention may have any form or appearance as long as it is disposed between the exposed inner circumferential surface of the roller and the exposed outer circumferential surface of the thrust bearing annular member in the condition of slidably contacting with and of not being deformed by the inner circumferential surface of the roller, prevents the lubricant oil from leaking to the outside, which is prone to occur, between the annular sealing member and the roller and prevents the foreign matter from entering the bearing element raceway while avoiding to wear or damage the inner circumferential surface of the roller. For instance, the annular sealing member may be either a ringed member that can be fitted around the whole circumference of the outer circumferential surface of the thrust bearing annular member or a spiral member.

Although the sealing member has been shown anchored in a groove in the outer exposed surface of the annular member to bear against the exposed inner circumferential surface of the roller, the sealing member can be mounted in a similar groove in the inner exposed surface of the roller to bear against the outer circumferential surface of the annular member.

The specific sealing sectional shape of the annular sealing member described above may be any one of a circular section, an elliptical section and a rectangular section. A surface contact condition is brought about, when the annular sealing member has a rectangular section, respectively with the inner circumferential surface of the roller and wall surfaces of the seal-fitting annular groove provided on the thrust bearing annular member. Accordingly, the annular sealing member prevents the lubricant oil from leaking to the outside further.

The sealing material of the annular sealing member described above may be any sealing material as long as it prevents the lubricant oil from leaking to the outside, which is prone to occur between the annular sealing member and the roller by bringing about the condition of slidably contacting with the inner circumferential surface of the roller without load, i.e., so-called zero-touch condition, even when the roller rotates in the condition eccentric in the radial direction with respect to the bush in conveying heavy loads. If the annular sealing member is composed of the elastic body of synthetic resin, for example, the annular sealing member is liable to be elastically deformed and exhibits self-lubricity, so that the annular sealing member can prevent the lubricant oil from leaking to the outside, which is prone to occur, between the annular sealing member and the roller further while avoiding to wear or damage the inner circumferential surface of the roller and can be easily assembled to the thrust bearing annular member.

Still more, the specific configuration of the thrust bearing annular member used in the conveyor chain of the invention may have any configuration as long as it is press-fitted to the outer circumferential surface of the bush, is disposed between inner side surface of the inner link plate and the end surface of the bearing element and has the seal-fitting annular groove for displaceably fitting the inner circumferential portion of the annular sealing member in the radial direction. For instance, when the thrust bearing annular member is provided with the oil reserving annular concave portion opening toward the end surface of the bearing element on the inner side surface thereof, the lubricant oil reserved temporarily within the oil reserving annular concave portion is supplied toward the end surface of the bearing element corresponding to the condition of amount of the lubricant oil at the end surface of the bearing element. Accordingly, the contact resistance in the chain width direction, i.e., the so-called thrust direction, between the inner side surface of the thrust bearing annular member and the end surface of the bearing element is considerably reduced.

The bush used in the conveyor chain of the invention may have any appearance as long as it has the central outer circumferential part as a race for the revolving bearing elements, and the end circumferential parts press-fitting the thrust bearing annular members and the inner link plates. For instance, it may be one having an equal outer diameter in the chain width direction or one having a large-diameter outer circumferential portion as a race for the rolling bearing elements and small-diameter outer circumferential portions disposed respectively on the both sides of the large-diameter outer circumferential portion to press-fit the thrust bearing annular members and the inner link plates. In the latter case, because it becomes possible to position the thrust bearing annular members in boundary areas between the large-diameter outer circumferential portion and the small-diameter outer circumferential portions, the thrust bearing annular members can be easily assembled with high assembling precision.

It is noted that the bush having the equal outer diameter in the chain width direction described above may be specifically any one of a longitudinal lapping bush, a forged bush and a molded oil-impregnated bush.

In addition to that, the link pin used in the conveyor chain of the invention may have any configuration as a pin as long as it is inserted through the bush and is press-fitted into both ends of the pair of right and left outer link plates. When the link pin includes a means for reserving the lubricant oil, it becomes possible to continuously supply the bearing element raceway, so that it becomes possible to keep rolling contact between the bush and the bearing elements and between the roller and the bush for a long period of time without requiring maintenance.

What is claimed is:

1. A conveyor chain having a series of links interconnected to form an elongated chain, each link comprising
   a pair of right and left inner link plates, said link plates having inner surfaces spaced apart on opposite sides of the chain, and having bush holes;
   a bush press-fitted into said bush holes, said bush having inner and outer circumferential surfaces;

a roller rotatably fitted around the bush, said roller having inner and outer circumferential surfaces;

a bearing raceway extending radially between said outer circumferential surface of the bush and said inner circumferential surface of said roller, and extending axially between said inner surfaces of said inner link plates;

a link pin inserted through said inner circumferential surface of said bush and having ends on each side of said chain;

a pair of right and left outer link plates, each link plate being press-fitted to one of said ends of said link pin, said outer link plates linking said inner link plates to the inner link plates of an adjoining link in said series in the longitudinal direction of said chain;

a plurality of bearing elements loosely inserted in said bearing raceway, and a pair of right and left thrust bearing annular members press-fitted to the outer circumferential surface of the bush, each annular member disposed between said inner side surface of the adjacent inner link plate and the adjacent end surfaces of the bearing elements; and an annular sealing member for sealing lubricant oil within said bearing raceway disposed between said inner circumferential surface of the roller and an outer circumferential surface of each thrust bearing annular member in a condition of slidably contacting with and of not being deformed by either the inner circumferential surface of the roller, or the outer circumferential surface of the thrust bearing wherein the annular sealing member comprises an outer circumferential surface that is displaceable in a radial direction;

wherein the outer circumferential surface of each thrust bearing annular member has a first diameter and an annular groove with a bottom having a second diameter, wherein the annular groove in each thrust bearing annular member receives the inner circumferential portion of one of the annular sealing members; and wherein each annular sealing member comprises an inner circumferential portion having a diameter larger than the second diameter and smaller than the first diameter.

2. The conveyor chain according to claim 1, wherein said thrust bearing annular members are fixedly connected with the outer circumferential surface of the bush at spaced apart positions to straddle the bearing elements, permitting the bearing elements to move slightly in the chain width direction and wherein the roller has inner circumferential-side flanges that slidably contact with the annular sealing member in a condition of embracing the bearing elements while permitting the bearing elements to move slightly in the chain width direction.

3. The conveyor chain according to claim 1, wherein said thrust bearing annular member has an oil-receiving annular concave groove opening to the end surfaces of the bearing elements at an inner side surface thereof.

4. The conveyor chain according to claim 1, wherein said bush has an oil inlet for supplying the lubricant oil within said link pin to the bearing element raceway.

5. The conveyor chain according to claim 1, wherein said annular sealing member is composed of an elastic body of synthetic resin.

6. A conveyor chain having a series of links interconnected to form an elongated chain, each link comprising a pair of right and left inner link plates, said link plates having inner surfaces spaced apart on opposite sides of the chain, and having bush holes;

a bush press-fitted into said bush holes, said bush having inner and outer circumferential surfaces;

a roller rotatably fitted around the bush, said roller having inner and outer circumferential surfaces, wherein an annular area between the outer circumferential surface of the bush and the inner circumferential surface of the roller forms a bearing raceway extending between the inner surfaces of the inner link plates;

a link pin inserted through said inner circumferential surface of said bush and having ends on each side of said chain;

a pair of right and left outer link plates, each link plate being press-fitted to one of said ends of said link pin, said outer link plates linking said inner link plates to the inner link plates of an adjoining link in said series in the longitudinal direction of said chain;

a plurality of bearing elements loosely inserted in said bearing raceway, and a pair of right and left thrust bearing annular members press-fitted to the outer circumferential surface of the bush disposed between the inner side surface of the adjacent inner link plate and the adjacent end surfaces of the bearing elements; and an annular sealing member for sealing lubricant oil within said bearing raceway, wherein the sealing element forms a sliding seal between the roller and one of the thrust bearing annular members and wherein the annular sealing member comprises an outer circumferential surface that is displaceable in a radial direction;

wherein the outer circumferential surface of each thrust bearing annular member has a first diameter and an annular groove with a bottom having a second diameter, wherein the annular groove in the thrust bearing annular member receives the inner circumferential portion of the annular sealing member; and wherein the annular sealing member comprises an inner circumferential portion having a diameter larger than the second diameter and smaller than the first diameter, wherein in response to radial force on the roller, a portion of the seal is displaced radially inwardly into the annular groove, while a portion of the seal is displaced radially outwardly from the annular groove.

7. The conveyor chain according to claim 6, wherein said thrust bearing annular members are fixedly connected with the outer circumferential surface of the bush at spaced apart positions to straddle the bearing elements, permitting the bearing elements to move slightly in the chain width direction and wherein the roller has inner circumferential-side flanges that slidably contact with the annular sealing member in a condition of embracing the bearing elements while permitting the bearing elements to move slightly in the chain width direction.

8. The conveyor chain according to claim 6, wherein the thrust bearing annular member has an oil-receiving annular concave groove opening to the end surfaces of the bearing elements at an inner side surface thereof.

9. The conveyor chain according to claim 6, wherein the bush has an oil inlet for supplying the lubricant oil within said link pin to the bearing element raceway.

10. The conveyor chain according to claim 6, wherein the annular sealing member comprises an elastic body of synthetic resin.

11. The conveyor chain according to claim 6 wherein the roller comprises a pair of radially inwardly projecting flanges spaced apart from one another a distance greater than the length of the bearing elements so that the bearing elements extend between the flanges and wherein ends of the bearing elements oppose the flanges.

12. The conveyor chain according to claim 6 wherein the sealing elements provide a seal to retain oil within the bearing raceway while permitting lateral displacement of the roller relative to the thrust bearing annular members.

13. Conveyor chain having a series of links interconnected to form an elongated chain, each link comprising
- a pair of right and left inner link plates having inner surfaces spaced apart from one another and having bush holes;
- a pair of right and left outer link plates;
- a bush press-fitted into the bush holes, wherein the bush has inner and outer circumferential surfaces;
- a roller rotatable around the bush, wherein the roller has inner and outer circumferential surfaces, wherein an annular area between the outer circumferential surface of the bush and the inner circumferential surface of the roller forms a bearing raceway between the inner link plates;
- a link pin inserted through the bush and having ends extending through the inner link plates and outer link plates;
- a plurality of bearing elements in the bearing raceway, and
- a pair of right and left bearing retainers connected with the outer surface of the bush, forming side walls with the bearing elements disposed between the side walls; and
- a pair of right and left annular seals formed of elastomeric material to seal lubricant oil within the bearing raceway, wherein the right seal forms a fluid seal between the roller and the right bearing retainer and the left seal forms a fluid seal between the roller and the left bearing retainer and where each seal provides a sliding seal to retain oil within the bearing raceway while permitting lateral displacement of the roller relative to the retainers; wherein the right seal is seated in a groove in the right bearing retainer and the left seal is seated in a groove in the left bearing retainer and wherein a gap between the inner diameter of each of the right and left seals and the inner diameter of the grooves in the right and left retainers allows the right and left seals to be displaced radially without being substantially deformed in response to a radial load on the roller.

14. The conveyor chain of claim 13 wherein:
- the outer circumferential surface of each retainer has a first diameter and an annular groove with a bottom having a second diameter, wherein the annular groove in the retainer receives an inner circumferential portion of the seal; and
- the inner circumferential portion having a diameter larger than the second diameter and smaller than the first diameter.

15. The conveyor of claim 13 wherein each seal comprises an outer circumferential surface that is displaceable in a radial direction.

16. The conveyor chain of claim 13 wherein the roller comprises a pair of radially inwardly projecting flanges spaced apart from one another a distance greater than the length of the bearing elements so that the bearing elements extend between the flanges and wherein ends of the bearing elements oppose the flanges.

17. The conveyor chain of claim 13, wherein the retainers have an oil-receiving annular concave groove opening to the end surfaces of the bearing elements at an inner side surface thereof.

18. The conveyor chain of claim 13, wherein the bush has an oil inlet for supplying the lubricant oil within the link pin to the bearing element raceway.

* * * * *